UNITED STATES PATENT OFFICE.

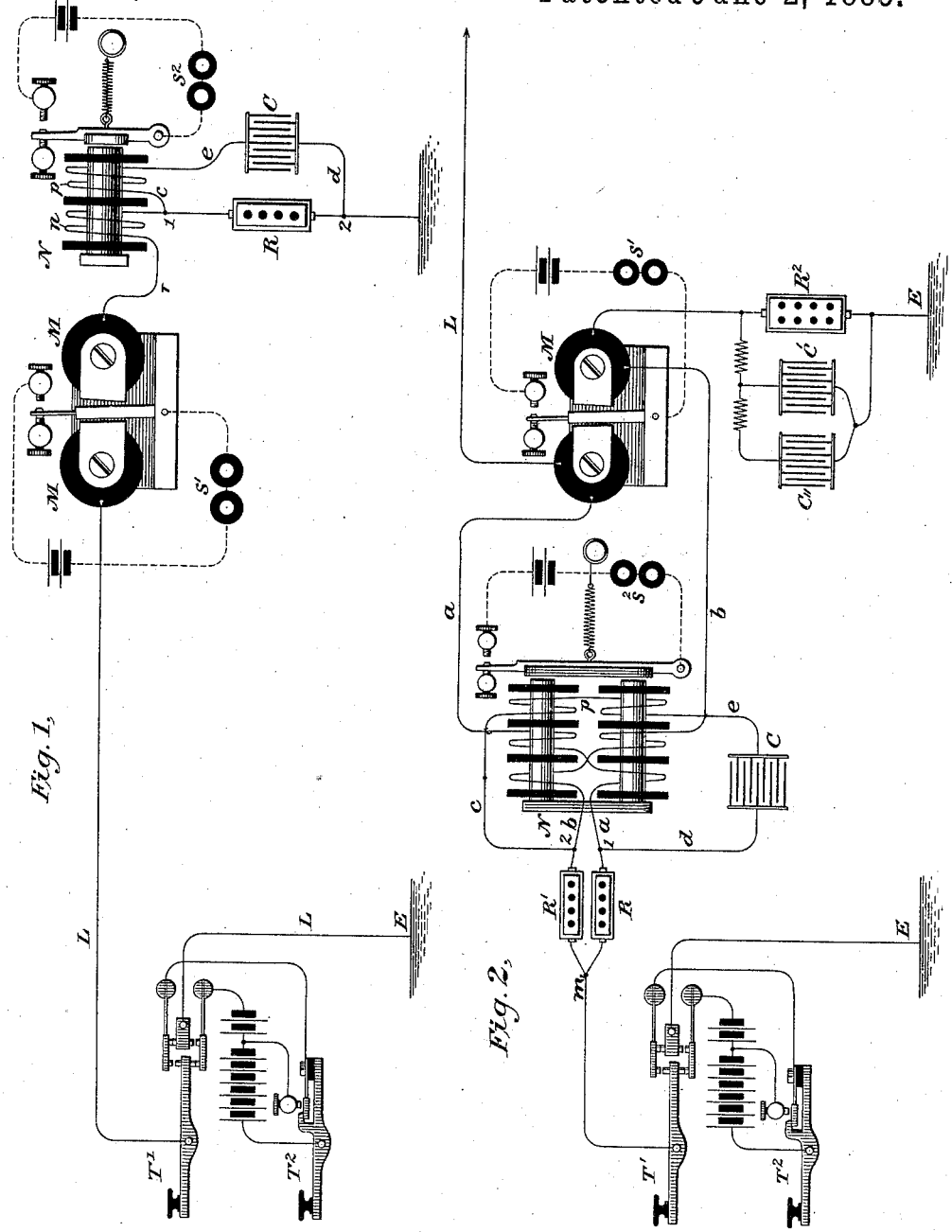

GERRITT SMITH, OF ASTORIA, NEW YORK.

QUADRUPLEX TELEGRAPH.

SPECIFICATION forming part of Letters Patent No. 319,428, dated June 2, 1885.

Application filed January 2, 1885. (No model.)

*To all whom it may concern:*

Be it known that I, GERRITT SMITH, of Astoria, county of Queens, State of New York, a citizen of the United States of America, have made a new and useful Improvement in Diplex and Quadruplex Telegraphy, of which the following is a specification.

In diplex and quadruplex telegraphs in which a polarized and a neutral relay are employed—one to record a message by changes of polarity, and the other a message by changes of current strength independent of polarity—it is well known that—upon each reversal of current for operating the polar relay a momentary cessation of magnetism occurs in the neutral relay, and that from such momentary demagnetization of the neutral relay its armature, if held at front contact at the moment of reversal, will be withdrawn by its retracting-spring, and if said armature is permitted to reach back contact, will cause a false signal to be made.

The object of my invention is to shorten the period of demagnetization of the neutral relay during reversals; and to this end, in a a quadruplex circuit, I employ a condenser whose opposite poles are respectively connected to the main and artificial lines at points between the junction of said lines and the receiving-instruments, and in case of a simple diplex I connect the two poles of a condenser, one to the main line at the receiving end, between the earth and the receiving-instruments, and the other directly to earth. A condenser as thus described may be advantageously used, though it is preferable to include in said condenser branch or circuit an electro-magnetic coil, which is so wound upon the core of the neutral relay as to cause the currents established by the charge and discharge of the condenser to so act as to hold the armature of said neutral relay to its core when it would otherwise be left free to the action of its retracting-spring and would be withdrawn to back contact.

It is well known that an insulated telegraph-line of considerable length, whether suspended above the earth or submerged in water, is capable of accumulating or storing up a quantity of electricity when connected with a battery. This property of an insulated conductor is termed its "inductive" or "electro-static" capacity, and the electricity so retained is termed the "static charge of the line." Owing to the capacity of a line for receiving a static charge, a current is not established throughout its entire length until a perceptible period of time has elapsed after connecting a battery thereto; and the period required for a current to become fully established at the remote end of a line is proportional to the length of line. Thus in case of a very long line, where its static capacity is great, a galvanometer placed in line at the distant end will not indicate a current in that part of the line until perhaps half a second after the battery has been connected thereto at its opposite end. If, instead of merely connecting a battery to line and then disconnecting it a battery permanently in line is reversed, there will be a period between a maximum current of one polarity and a maximum current of opposite polarity about equal to the time required for the line to receive its full charge, and during the larger part of said period the current will either be practically of zero strength or too weak to enable the neutral relay to retain its armature against the force of its retracting-spring. Not only is much time consumed in charging a long line, but from the same cause almost the same time is lost in the discharging of the line. In my invention the condenser is so arranged as to absorb a large static charge at a point of the main line just beyond the neutral relay at the receiving-instrument, and while said condenser is receiving its charge an abnormal current will flow through said relay. A large current will flow into the condenser before it will pass to earth over the main line, since the condenser has practically no resistance, while the main line from the junction of the condenser branch to earth has many hundred ohms. The necessity for connecting the condenser branch to the main line at the receiving end between the relay and the earth is obvious from the fact that if it were connected with the main line between the relay and the transmitting end the current set up by charging the condenser would not pass through the relay-coils, but would merely pass over the main line to the condenser branch, down said branch to the condenser, and thence to earth from the other pole of the condenser, thus finding a path to earth short of the relay. By winding the condenser branch into an electro-magnetic coil upon the neutral relay not only does the current due to the charging of the condenser exert a beneficial effect by passing through the primary coil of the relay, but it also acts through the secondary coil forming a part of the condenser branch. Upon connecting a battery to line at the transmitting end the current due to the charging of the condenser would first act to attract the neutral armature of the distant relay in advance of the establishing of a full current at the earth end of the line, and upon removing the battery from line the discharging of the condenser sets up a current which continues to hold the armature of the relay toward its core. The discharge of the condenser occurs immediately upon a cessation of the main-line current at the receiving end, due to removing the battery from line at the transmitting end; but the current of the condenser-discharge establishes an opposite polarity of magnetism in the relay from that set up by the preceding main-line current. Thus at the moment of cessation of the main-line current the condenser current, discharging only feebly at first, acts differentially, or in opposition to the main-line current, and gradually increases in strength until the main-line current has become materially reduced, when the magnetism of the neutral relay becomes reversed. The current of discharge from the condenser at the termination of a battery-current acting in a direction opposite to that of the battery-current upon the neutral relay produces a magnetism in said relay of the same polarity as a reverse battery-current. Thus if the main-line current is reversed the discharge of the condenser following the first direction of current acts in the same manner upon the neutral relay as the reverse current. The condenser-discharge precedes the battery-current reversal, and bridges over any absence of current at the receiving end of a long line during said reversal, and while the main line is discharging and recharging. The period of reversal is thus rendered only momentary, and continues only while the main-line current is falling and the condenser is beginning to discharge.

Figure 1 is a diagram of a diplex-telegraph apparatus in which one message is transmitted by reversals of current independently of changes in strength and received upon a polar relay, and in which a second message is transmitted by change in current strength independently of reversals of current and received upon a neutral relay. Fig. 2 is a diagram showing a quadruplex set at one end of the line—that is, a set of transmitting and receiving instruments at one station in which two messages, one by reversals and the other by changes in current strength, may be received from a distant station, while simultaneously two separate messages, one by reversals and the other by changes in current strength, may be transmitted to the distant station.

In Fig. 1 L is a main line normally including a weak battery whose poles may be alternately reversed by key T'. An additional section of battery may be added and removed in a well-known manner, and as indicated in the diagram by $T^2$. Key T' normally serves to reverse the small section of the battery while key $T^2$ is open, and to reverse the entire battery when key $T^2$ is closed.

M is a receiving-instrument which is only responsive to reversals of main-line current, whether of a section only or of the entire main-line battery.

N is a neutral relay responsive only to changes of current strength, and not to reversals. The neutral relay N is provided with coils $n$ and $p$.

$n$ is the primary coil of the neutral relay, and forms a portion of the main line L, which is connected to earth by a resistance, R, of several hundred ohms. Coil $p$, beginning at point 1 of the main line, is wound upon the relay-core as though it were a continuation of coil $n$. The wire $c$ of coil $p$, beginning at point 1, is continued by wire $e$ to the upper pole of condenser C, while the opposite pole of said condenser is connected by wire $d$ to point 2 of the main line, and thence to earth. Resistance R should usually be of four hundred or five hundred ohms. It must, however, under all circumstances be sufficient to cause the condenser to receive an adequate charge for the purpose required. It will therefore be seen if a main-line current were passing from the transmitting-station over line L and through coil $n$ that while line L through coil $n$ was receiving its charge only a small current would be established, owing to the resistance R. If, however, the resistance R were removed and the current were afforded a free passage to earth, or to any other reservoir offering no resistance, a strong current would be established through coil $n$ almost at the instant that the current in the line had become established through said coil.

To enable the establishment of a current through coil $n$, and before it could otherwise be established owing to resistance R, connection is made from point 1 by wires $c$ and $e$ with the upper pole of condenser C. When a current arrives at point 1, instead of being compelled to pass wholly over resistance R, a great portion will pass by wires $c$ and $e$ into the condenser, and while the condenser is receiving its charge a strong current will necessarily be set up through coil $n$. The advantage of condenser C is thus apparent, whether coil $p$ is included in the wires $c$ and $e$ or not. However, by including the coil $p$ in said wire, not only does the condenser afford a free path for the main line to flow into, but all of the current flowing into said condenser passes around to coil $p$, and therefore enables coil $p$ to establish a magnetic action helping that due to coil $n$.

The necessity for connecting wires $c$ and $e$ to line L at a point between the neutral relay and the earth, rather than between the transmitting-station and the relay, is apparent from the fact that if the condenser were connected to the line between the relay and the transmitting-station any current flowing into the condenser would in no wise add to the current flowing through the primary coils of the neutral relay. If a battery were first connected to the main line at the transmitting-station, as has before been stated, a perceptible length of time would be required for the main line to receive its charge at the receiving end, and if the battery, after the line had become fully charged, were removed from line, a period would also be required for the discharge of said line. Now, if the line has been fully charged and the battery is removed at the instant the current on the main line diminishes, a current of discharge from the condenser will flow from said condenser over wire $e$, through coil $p$, wire $c$ to point 1, resistance R, point 2, and by wire $d$ to the opposite pole of the condenser, thus tending to establish magnetism of a polarity opposite to that established by the preceding main-line current, and as the main-line current still further diminishes the condenser-discharge will increase until finally magnetism due to the condenser-discharge will exceed that due to the diminished main-line current until the magnetism in the neutral relay will become reversed. Thus it is seen that from the action of the condenser a reversal of magnetism in the neutral relay will occur before the main-line current at the receiving end has been fully discharged, and that the function of the condenser is to obliterate all effects commonly known as those due to "tailings." Upon removing a main-line battery, as has just been seen, a reversal of magnetism in the neutral relay occurs from the action of the condenser—that is, from the discharge of the condenser in a direction opposite to that of the preceding main-line current. Now, if the main-line current is reversed, the succeeding or reversed main-line current will be in the same direction as that of the condenser-discharge due to the preceding main-line current. Thus the condenser-discharge in each instance sets up a current in the neutral relay in advance of each succeeding main-line current, and no interval which might otherwise occur between two reversals of current at the distant end, owing to the time required for the line to discharge and become recharged, can occur. With the condenser, instead of there being any perceptible interval in the discharge of the line at the receiving end and the recharge of said line, the reversal occurs at the very instant that the main-line current has discharged below a certain amount. Thus the armature of the neutral relay at the time of current reversals will be firmly held at front contact, and will not have time to be withdrawn to its back or working contact by its retracting-spring. In a quadruplex arrangement, where transmission must be effected without causing false signals upon the associated receiving-instruments, it is necessary that the condenser branch should be connected by wires $c$ and $d$ (see Fig. 2) to points of equal potential, Figs. 1 and 2, of the main and the artificial lines. Therefore the resistance R of, say, four hundred and fifty ohms, in the main line between $m$ and 1 must be supplemented by an equal resistance, R', between points $m$ and 2 on the artificial line $b$. If the resistances R and R' were not substantially equal in a differential system, the potentials of points 1 and 2 would not be equal, and currents transmitted from this end of the line would cause condenser C to be charged and discharged with each transmission from the home station, thus causing false signals upon relay N, which should only be responsive to currents from a distant station. As will be seen by inspecting Fig. 2, a current arriving from a distant station over the main line will pass through relay M, neutral relay N, and thence by wire $a$ to point 1. At point 1 the current will divide, a portion flowing over resistance R and thence to earth. Another portion of the current will flow from point 1 by wire $d$ to one pole of condenser C, thence from the other pole of the condenser by wire $e$ to coil $p$, and from coil $p$ by wire $c$ to point 2, and thence through resistance R' to point $m$ and to earth. As has been described in connection with Fig. 1, it will be readily seen by inspection of Fig. 2 that the current set up in coil $p$ by the condenser-discharge will serve to bridge over reversals in the main-line current, and will therefore prevent the retraction of the armature-lever during such reversals, and the consequent mutilation of signals upon the sounder of the neutral relay.

What I claim, and desire to secure by Letters Patent, is—

1. In a diplex or a quadruplex telegraph system, the combination of a neutral relay, and a condenser connected to the main line at a point between the neutral relay and the earth at the receiving end and to the earth.

2. In a diplex or quadruplex telegraph system in which reversals of current are employed for the transmission of one set of signals, a neutral relay, a resistance between said relay and the earth at the receiving end of the line, and a condenser whose opposite poles are respectively connected to the earth and to the main line between the relay and the earth, substantially as shown.

3. In a diplex and quadruplex telegraph system in which reversals of current are employed for the transmission of one set of signals, a neutral relay provided with two coils, one of which is embraced in the main line and the other in a branch, which branch also includes a condenser and is connected with the main line at a point between the earth and said neutral relay and with the earth, substantially as described.

4. In a quadruplex-telegraph system, the combination of main and artificial lines, a differential neutral relay, a condenser branch, including auxiliary coils $p$ and condenser C, connected to the main and artificial lines at points of equal potential, and means at both ends of said telegraph-line for transmitting messages by reversals of current, substantially as described.

5. In a quadruplex-telegraph system, the combination of a neutral differential relay, a condenser branch connecting auxiliary coils $p$ and condenser C joining the main and artificial lines at points of equal potential between said neutral relay and the earth-connection at the same station, and a main line having means at both ends, respectively, for the transmission of messages by current reversals, substantially as described.

6. In a quadruplex-telegraph system, the combination of a neutral differential relay, of a main and an artificial telegraph line, a condenser branch, including condenser C, joining said main and artificial lines at points of equal potential between said neutral relay and the earth at the same station, and means for transmitting messages respectively from both ends of the telegraph-line by current reversals.

7. In a diplex or quadruplex telegraph system, the combination of means for transmitting reversals of current on the main line, a neutral relay, N, having coils $n\ p$, resistance R, and condenser C, substantially as described.

8. In a telegraph system, the combination of a main line, a condenser branch, a neutral relay having a primary coil in the main line and a secondary coil in the condenser branch, and a resistance in said main line between said relay and the earth at the receiving-station, to the extremities of which resistance the condenser branch is connected, substantially as described.

GERRITT SMITH.

Witnesses:
 WM. ARNOUX,
 S. S. WATTERS.